Patented Mar. 27, 1945

2,372,623

UNITED STATES PATENT OFFICE 2,372,623

DE-EMULSIFYING AGENTS

Daniel Zinner, Wilmington, Del., assignor to E. I. du Pont de Nemours & Company, Wilmington, Del., a corporation of Delaware No Drawing. Application July 2, 1942, Serial No. 449,515

3 Claims. (Cl. 252—326)

This invention relates to a process of de-emulsifying aqueous emulsions of liquid aromatic compounds.

It is known that aqueous emulsions of petroleum may be broken by means of certain de-emulsifying agents. These agents are for the most part surface active compounds which by trial and error have been found to be of value in such operations. Aqueous emulsions which did not involve the presence of petroleum hydrocarbons were frequently encountered, but because of their extreme stability have heretofore been broken by filtration or steam distillation. As is apparent, these methods of breaking non-petroleum type emulsions are time-consuming and expensive.

A type of aqueous emulsion which has been particularly difficult to break is that involving the presence of liquid aromatic compounds, especially those having substituted thereon a nitro group. Emulsions of this type are generally extremely stable and have successfully resisted most simple expedients for their separation.

It is an object of this invention to break aqueous emulsions of liquid aromatic compounds in a simple and economical manner. It is a further object to break aqueous emulsions of liquid nitroaromatic compounds by the use of a series of chemical de-emulsifying agents which have been found to be particularly applicable thereto. It is a further object of this invention to break aqueous emulsions of liquid nitroaromatic compounds in a much more economical manner than was heretofore possible. Additional objects will become apparent from a consideration of the following description and claims.

These objects are attained in accordance with the herein described invention by adding to the aqueous emulsions of liquid aromatic compounds a surface active agent having substituted thereon an alkyl group of at least eight carbon atoms, the calcium salt of which agent is soluble in water, thereafter agitating the resulting mixture to obtain a thorough dispersal of said surface active agent therethrough, and then permitting the so-agitated mixture to settle and stratify. In a more restricted sense the invention pertains to the breaking of emulsions of liquid aromatic compounds by adding thereto a water soluble salt of a sulfuric acid ester of a normal primary alcohol having at least eight carbon atoms and then treating the mixture in the aforesaid manner. In a still more restricted sense the invention is concerned with the breaking of aqueous emulsions of liquid aromatic nitro compounds of the benzene series by adding thereto a water soluble salt of a sulfuric acid ester of a normal primary alcohol having between eight and twenty-four carbon atoms, agitating the resulting mixture to obtain a thorough dispersal of said surface active agent therethrough, and then permitting it to settle and stratify. In its preferred embodiment the invention pertains to the breaking of aqueous emulsions of chlor-nitro-toluene by adding thereto the sodium salt of the acetic acid ester of sulfated oleyl alcohol, thoroughly agitating the resulting mixture and then permitting it to settle and stratify.

The invention may be more readily understood by a consideration of the following examples, which are for purposes of illustration only.

Example 1

To 1000 parts by weight of crude chlor-nitro-toluene are added 1000 parts by weight of water and 10 parts by weight of hydrochloric acid 20° Bé. and the mixture is agitated at a temperature of 50–60° C. for about 15 minutes. If at this stage an emulsion has formed, as determined by preliminary tests on small samples, then 1 part by weight of the sodium salt of the acetic ester of sulfated oleyl alcohol is added, the mixture is agitated for about 5 minutes longer, and then allowed to settle. After the addition of the sulfated alcohol, the chlor-nitro-toluene separates from the wash water and settles to the bottom. The wash water, which contains the hydrochloric acid and impurities, separates out as the top layer and can be syphoned off.

Washings with dilute hydrochloric acid are repeated as described above until all impurities soluble in the wash water are removed. The addition of the treating agent to the first wash prevents the reoccurrence of emulsions in subsequent washes.

Example 2

To 1000 parts by weight of crude chlor-nitro-benzene add 1000 parts by weight of water and 10 parts by weight of hydrochloric acid 20° Bé. and agitate the mixture for about 15 minutes at a temperature of 50–60° C. If at this stage an emulsion has formed, as determined by preliminary tests on small samples, then 1 part by weight of the sodium salt of the acetic ester of sulfated oleyl alcohol is added, the mixture is agitated for 5 minutes longer and then allowed to settle. After the addition of the sulfated alcohol, the chlor-nitro-benzene separates from the wash water and settles to the bottom. The wash water, which contains the hydrochloric acid and the impurities, separates out as the top layer and can be syphoned off.

Washings with dilute hydrochloric acid are repeated as described above until impurities soluble in the wash water are removed. With the addition of the treating agent to the first wash, emulsions do not appear to reoccur in subsequent washes.

*Example 3*

To 1000 parts by weight of crude chlor-nitro-toluene add 1000 parts by weight of water and 50 parts by weight of hydrochloric acid 20° Bé. and agitate the mixture for about 15 minutes at 50-60° C. If at this stage an emulsion has formed, as determined by preliminary tests on small samples, then add 1 part by weight of the sodium salt of sulfated cetyl alcohol and agitate the mixture for 5 minutes longer and then allow to settle. After the addition of the sulfated alcohol, the chlor-nitro-toluol separates from the wash water and settles to the bottom. The wash water, which contains the hydrochloric acid and the impurities, separates out as the top layer and can be syphoned off.

Washings with dilute hydrochloric acid are repeated as described above until impurities soluble in the wash water are removed. With the addition of the treating agent to the first wash, emulsions do not appear to reoccur in subsequent washings.

It is to be understood that the foregoing examples are descriptive merely of the many modifications to which the present invention is subject. The specific embodiments thereof may be varied widely without departing from the scope of this invention.

The preferred de-emulsifying agents are the sodium salts of the sulfuric acid esters of normal primary alcohols having between eight and twenty-four carbon atoms, particularly the sodium salt of acetylated and then sulfated oleyl alcohol, which is referred to in Examples 1 and 2 hereof. In place of the sodium salts of these surface active agents other water soluble salts or mixtures thereof may be employed. Water soluble salts of sulfuric acid esters of the following normal primary alcohols, or mixtures thereof, have been found to be of particular value for this purpose—lauryl, myristyl, cetyl, stearyl and oleyl.

In addition to the aforementioned normal primary alcohol derivatives certain other surface active agents may be used. These agents have substituted thereon an alkyl group of at least eight carbon atoms, and in the form of their sodium salts are soluble in water, unlike common soap. Examples of a few of such compounds are stearyl trimethyl ammonium bromide, water soluble salts of sulfonated alkyl naphthalenes, and water soluble salts of alkyl sulfonic acids having from thirteen to twenty-two carbon atoms in the molecule. Surface active agents of this type are well known and may be readily selected from the prior art in accordance with the aforesaid directions.

Aqueous emulsions which are particularly susceptible to the present treatment are produced in the processing and purification of liquid aromatic compounds. Particularly amenable to this treatment are aqueous emulsions of liquid nitro aromatic compounds of the benzene series. A representative few of such compounds are nitrobenzenes, nitrotoluols, nitroanisols, and their various well known derivatives.

The amount of de-emulsifying agent added, the method of agitating the resulting mixtures and the temperature and time of such agitation may, of course, be varied widely without departing from the scope of this invention. For any given emulsion the particular conditions for optimum results may readily be ascertained by simple and well known tests. Because of the large number of emulsions to which this invention is applicable no attempt will be made to delineate the specific optimum conditions for each de-emulsification operation.

By means of this invention a speedy and economical method of breaking aqueous emulsions of liquid aromatic compounds has been devised. This operation is much more direct and economical than the filtration and steam distillation operations previously deemed essential for this purpose. A class of agents having particular value for this purpose has been rendered available by means of this invention. These agents are cheap, simple to use and surprisingly effective.

As many apparently widely different embodiments of this invention may be made without departing from the spirit and scope thereof, it is to be understood that the invention is not limited to the specific embodiments thereof except as defined in the appended claims.

I claim:

1. A process for breaking aqueous emulsions of liquid nitro aromatic compounds of the benzene series which comprises adding to said emulsions a water soluble salt of a sulfuric acid ester of a normal primary alcohol having between eight and twenty-four carbon atoms, agitating the resulting mixture to obtain a thorough dispersal of said surface active agent therethrough, and then permitting the so-agitated mixture to settle and stratify.

2. A process for breaking aqueous emulsions of chlor nitro toluene which comprises adding to said emulsions the sodium salt of the acetic ester of sulfated oleyl alcohol, agitating the resulting mixture to obtain a thorough dispersal of said surface active agent therethrough, and then permitting the so-agitated mixture to settle and stratify.

3. A process for breaking aqueous emulsions of liquid nitroaromatic compounds of the benzene series which comprises adding to said emulsions a water-soluble salt of the acetic acid ester of sulfated oleyl alcohol, agitating the resulting mixture to obtain a thorough dispersal of said surface active agent therethrough, and then permitting the so-agitated mixture to settle and stratify.

DANIEL ZINNER.